(12) United States Patent
Durston

(10) Patent No.: US 8,237,427 B2
(45) Date of Patent: Aug. 7, 2012

(54) WIDEBAND HIGH IMPEDANCE BRIDGING MODULE

(75) Inventor: Thomas W. Durston, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 482 days.

(21) Appl. No.: 12/485,383

(22) Filed: Jun. 16, 2009

(65) Prior Publication Data

US 2010/0315065 A1    Dec. 16, 2010

(51) Int. Cl.
*G01R 19/00* (2006.01)
*G01R 27/00* (2006.01)

(52) U.S. Cl. .......................... 324/66; 324/600

(58) Field of Classification Search .............. None
See application file for complete search history.

(56) References Cited

U.S. PATENT DOCUMENTS

| | | | |
|---|---|---|---|
| 4,758,792 A | 7/1988 | Polonis et al. | |
| 6,259,256 B1 | 7/2001 | Walling | |
| 6,556,661 B1 | 4/2003 | Ingalsbe et al. | |
| 6,812,712 B2 | 11/2004 | Linzey | |
| 7,250,772 B2 | 7/2007 | Furse et al. | |
| 7,902,810 B2 * | 3/2011 | Naylor et al. | 324/66 |
| 2003/0001588 A1 | 1/2003 | Rockwell et al. | |
| 2003/0125893 A1 | 7/2003 | Furse | |
| 2004/0150383 A1 * | 8/2004 | Blais | 324/73.1 |
| 2007/0194796 A1 | 8/2007 | Harrison et al. | |
| 2008/0224712 A1 | 9/2008 | Peyton et al. | |
| 2008/0303533 A1 | 12/2008 | Wu et al. | |

FOREIGN PATENT DOCUMENTS

| | | |
|---|---|---|
| EP | 1 248 444 | 10/2002 |
| WO | 00/42444 | 7/2000 |
| WO | 2004/032461 | 4/2004 |
| WO | 2009/030875 | 3/2009 |

OTHER PUBLICATIONS

A Tec-Alert Newsletter from Tecra Tools; "What to Look for in an Ideal LAN Tester"; Copyright 2007; Two (2) pages.
A brochure from Fluke Networks of the MicroMapper Pro VDV Cable Tester; Copyright 2006; Two (2) pages.
A brochure for SebaKMT's Cable Test Bridge KMK 7 (Copper Cable Test Equipment) technical data; Date not available; Two (2) pages.
European Search Report dated Sep. 16, 2010; Six (6) pages.

* cited by examiner

*Primary Examiner* — Roberto Velez
(74) *Attorney, Agent, or Firm* — Clark Hill PLC

(57) ABSTRACT

A bridge module provides connection between first and second conductors of a line under test and a test instrument adapted for use with the bridge module. The bridge module provides monitoring and measurement of DSL communication signals between the telephone company DSL terminal (DSLAM) and the subscriber home DSL equipment across a wide range of frequencies. The bridge module can be used at any point in the communications link and can be used while the link is active. The bridge module provides a clickless connection to the active DSL communications link to avoid interruption in DSL service.

27 Claims, 6 Drawing Sheets

WIDEBAND HIGH IMPEDANCE BRIDGING MODULE

BACKGROUND OF THE INVENTION

Communication failure in DSL circuits typically results from noise or other problems in the DSL circuit. Correction of the failure and improvement of the DSL service typically involves measurement, identification, and isolation of noise in a wide frequency range, for example in a range of 4000 Hz up to 30 MHz.

Currently available wideband DSTL measurement methods are low impedance, highly invasive and require disruption of the communications link between the telephone company DSL terminal (DSLAM) and the subscriber home DSL equipment. These methods require connection at either end of the DSL communications line, thereby preventing DSL communications and disturbing the measurement environment.

One example of such a measurement tool is multifunction test tool sold by Tempo under the trademark Sidekick® Plus. A typical cable used to carry telecommunication signals from the DSLAM to the subscriber's home DSL equipment includes a plurality of twisted pairs surrounded by a cable shield and a sheath. The test tool provides for connection of the test tool to the twisted pair to carry out a plurality of tests which assist in measuring, identifying and isolating noise and other problems on the twisted pair. The Sidekick® Plus, for example, is capable of performing loop current tests, longitudinal balance (Stress Test), transmission and noise tests. As with other currently available test tools, the Sidekick® Plus is low impedance, highly invasive and requires disruption of the communications link between the DSLAM and the subscriber's home DSL equipment. The disruption of the communication link not only prevents DSL communications but disturbs the measuring environment.

SUMMARY OF THE INVENTION

A bridge module is provided for connection between first and second conductors of a line under test to a test instrument. The bridge module adapts the source impedance of the line under test to the load impedance of the test instrument to provide a clickless connection of the bridge module to the line under test, thereby avoiding disruption of the service on the line.

The bridge module includes first and second high impedance resistors in communication with the first and second conductors of the line under test and first and second input switches in communication with the first and second conductors of the line under test. First and second coupling capacitors are provided in communication with the input switches and the high impedance resistors. When the switches are in an off state a charging path is provided to the coupling capacitors through the high impedance resistors to slowly charge the coupling capacitors. After charging of the coupling capacitors, the input switches are switched to an on state and DSL signals are provided to a receiver. The receivers amplify the power of the received signal before passing the signal to the test instrument.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
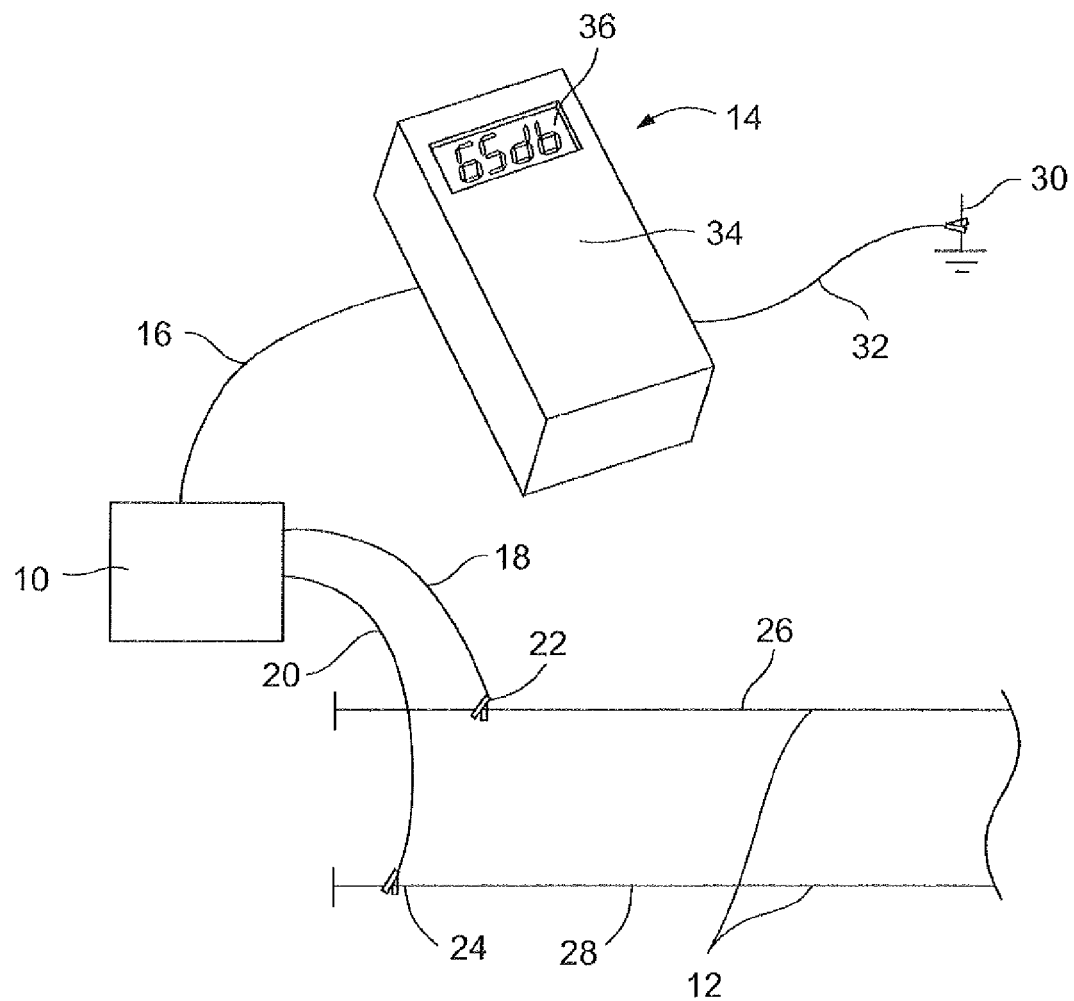
FIG. 1 is a block diagram illustrating connection of the bridge module to a test instrument and to the first and second conductors of a line under test.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

As shown in FIG. 1 the invention provides a bridge module 10 for use in testing of a line under test 12 of a telecommunication circuit. As also shown in FIG. 1 the bridge module 10 is used with a test instrument 14 to test the line under test in order to detect and identify problems in the telecommunications circuit which can cause disruption in or failure of the telecommunications circuit. The bridge module 10 includes a housing (not shown) which houses the bridge module circuit (see FIG. 3). An interconnect cable 16 is provided to connect the bridge module to the test instrument 14. First and second leads 18, 20 are provided to connect the bridge module 10 via clips 22, 24 to a first conductor 26 and a second conductor 28 of a twisted pair of the line under test 12.

The test instrument 14 includes a housing 34 which houses circuitry for testing of the line under test 12. A display 36 is provided to display information to the user relating to the tests performed. The test instrument 14 receives the interconnect cable 16 to provide communication from the bridge module 10 to the test instrument 14. A ground lead 32 is also provided in order to connect the test instrument 14 to earth ground 30. As will be described herein, the test instrument 14 functions as a host system for the bridge module 10. The test instrument can be, for example, a Sidekick® Plus test instrument which has been adapted to be used in connection with the bridge module 10.

Figure 2A:
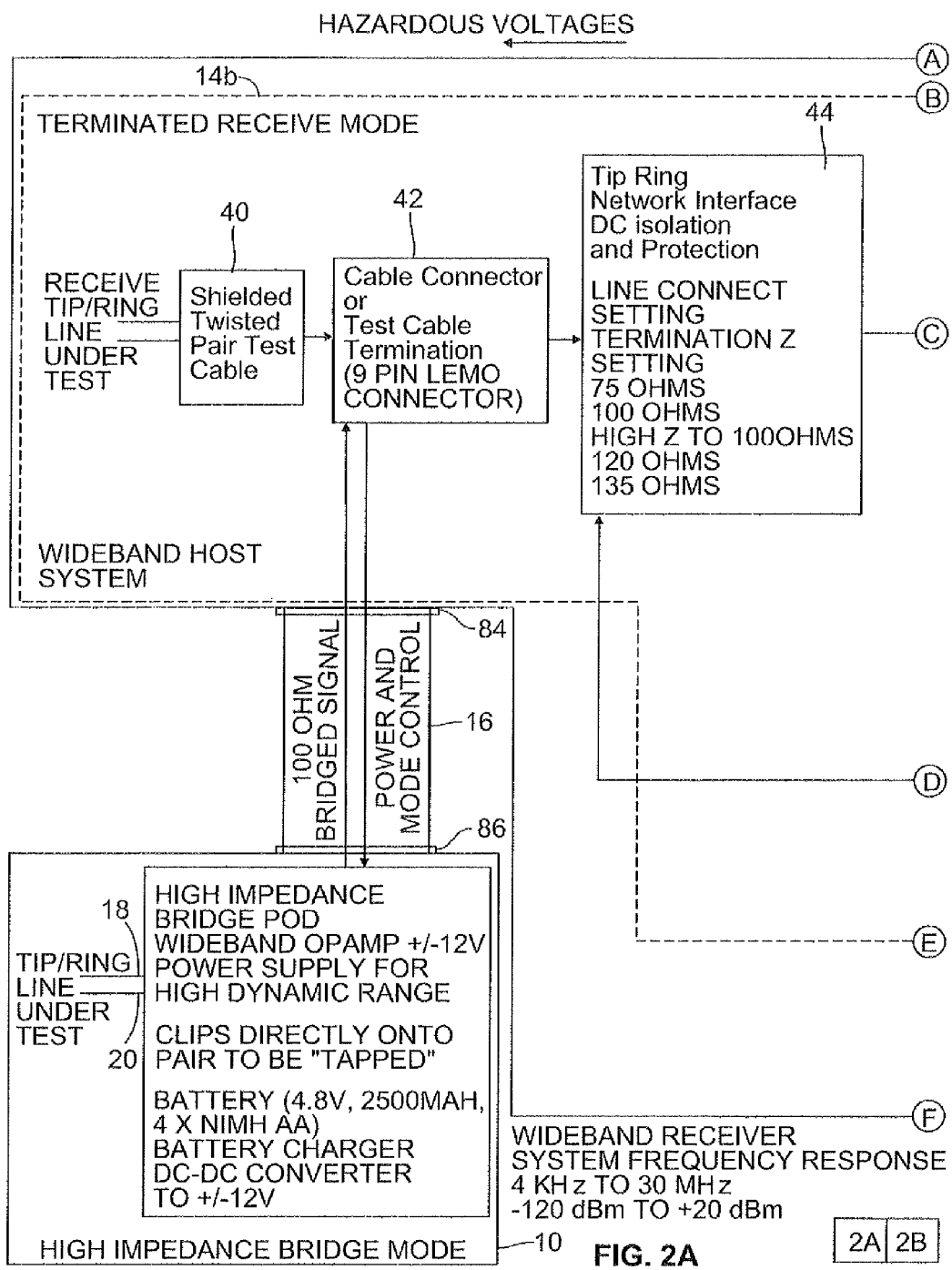
FIG. 2A is a block diagram further illustrating a first portion of the circuits of the bridge module, the test instrument, and the connection therebetween along with a legend illustrating the relationship between FIG. 2A and FIG. 2B.
Figure 2B:
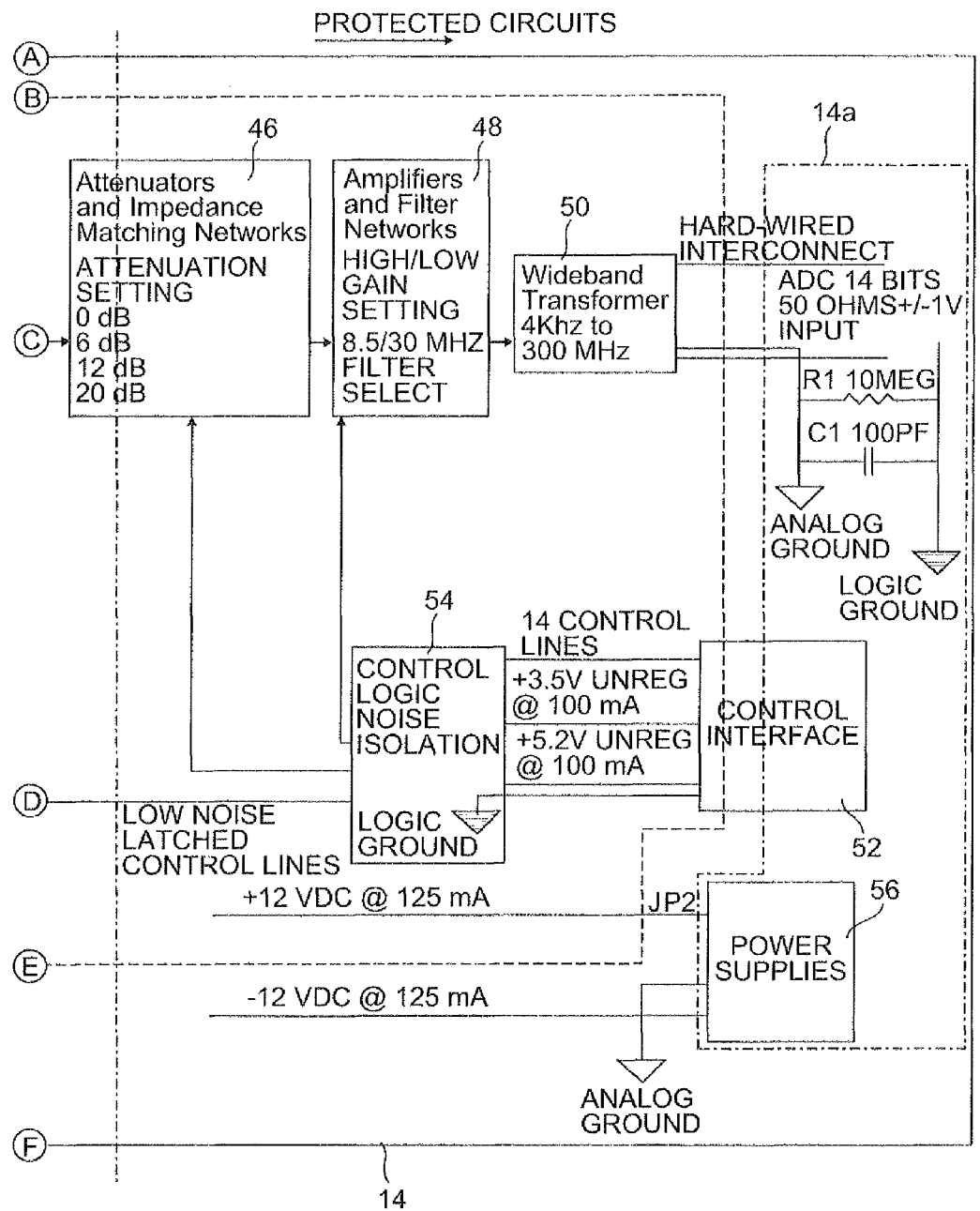
FIG. 2B is a block diagram further illustrating a second portion of the circuits of the bridge module, the test instrument and the connection therebetween along with a legend illustrating the relationship between FIG. 2A and FIG. 2B.

A block diagram illustrating the circuitry of the test instrument/host system 14 and the bridge module 10 is shown in FIG. 2. The test instrument 14 generally includes a core host system 14a and a wideband host system 14b. The core host system 14a includes circuitry found in test instruments typically used for analyzing the line under test, such as those found in the SideKick® Plus, for example.

The wideband host system 14b includes circuitry which allows the test instrument to work in connection with the bridge module 10. The wideband host system 14b of the test instrument 14 includes a shielded twisted pair connection 40, a cable connector 42, a network interface 44, attenuators and impedance matching networks 46, amplifiers and filter networks 48, a wide band transformer 50, a control interface 52, and a control logic noise isolation portion 54.

The shielded twisted pair connection 40 provides for connection of the test instrument 14 to the first and second conductors 26, 28 (tip and ring) of the line under test 12 when the bridge module 10 is not utilized.

The cable connector or test cable termination 42 receives the interconnect cable 16 when the bridge module 10 is to be utilized in connection with the test instrument 14. The cable connector 42 can be, for example, a nine-pin LEMO connector.

The network interface 44 provides isolation and protection of the remainder of the test tool circuitry from hazardous DC signals. The network interface 44 allows for selection of the termination impedance and can for example allow for selection of termination impedance ranging from approximately 75 Ohms to 135 Ohms. Signals present on the tip and ring 26, 28 of the pair 12 are passed to attenuators and impedance matching networks 46 through the network interface 44.

Amplifiers and filters 48 receive the signals from the attenuators and impedance matching networks 46 and pass the signals to the wide band transformer 50. The gain of the amplifier can be selected for provide either high or low gain. And the filter can be selected to provide filtering in the range of 8.5 MHz to 30 MHz.

The wideband transformer 50 is capable of handing signals in the range of approximately 4 Khz To 300 MHz.

The control interface 52 in connection with the control logic noise isolation circuit 54 provides an interface which allows the user to control the setting of the wideband host system such as a gain of the amplifier, a frequency of the filter, an attenuation setting, and a termination impedance.

The core host system 14a provides a power supply 56 and provides for connection to the control interface 52 of the wideband host system 14b. Details of the core system 14a are not illustrated.

As best shown in FIG. 2, the bridge module 10 generally provides connection to the test instrument 14 through the interconnect cable 16. The interconnect cable 16 is preferably approximately six (6) feet long and is of a controlled impedance. The interconnect cable 16 preferably includes a minimum of five (5) conductors. Connection between the bridge module 10 and the first and second conductors 26, 28 of the line under test 12 is provided by first and second leads 18, 20. First mid second leads 18, 20 are preferably short. More specifically, first and second leads 18, 20 are preferably a fraction of a quarter wavelength of the highest frequency signal to be measured by the test instrument 14. For example, if the DSL signals to be measured have a frequency of 30 MHz, the wavelength associated with these frequencies is 10 meters. Thus, the length of the test leads 18, 20 should be a fraction of one-fourth of 10 meters i.e. a fraction of 2.5 meters. Preferably the length of the leads 18, 20 is less than 10% of the quarter wavelength. In the example given, therefore, the length of the leads is preferably less than 0.25 meters. The shorter leads 18, 20 minimize the effect of bridged-tap reflections and standing waves introduced by the bridging connection to the line under test.

It is noted that the first and second leads 18, 20 are relatively short requiring close proximity of the bridge module 10 to the line under test 12, however, connection of the test instrument 14 to the bridge module 10 is provided by the cable 16. Thus, the cable 16 can be sufficiently long to allow the user to comfortably hold the test instrument 14 and view the display 36, as shown in FIG. 1.

The bridge module 10 is used in connection with the test instrument 14 for passive monitoring of the line under test 12. When the test instrument 14 is used for passive monitoring of the line under test no signals are provided by the test instrument to the line under test and the bridge module 10 provides for one way communication of the signals on the line under test 12 to the test instrument 14.

Figure 3A:
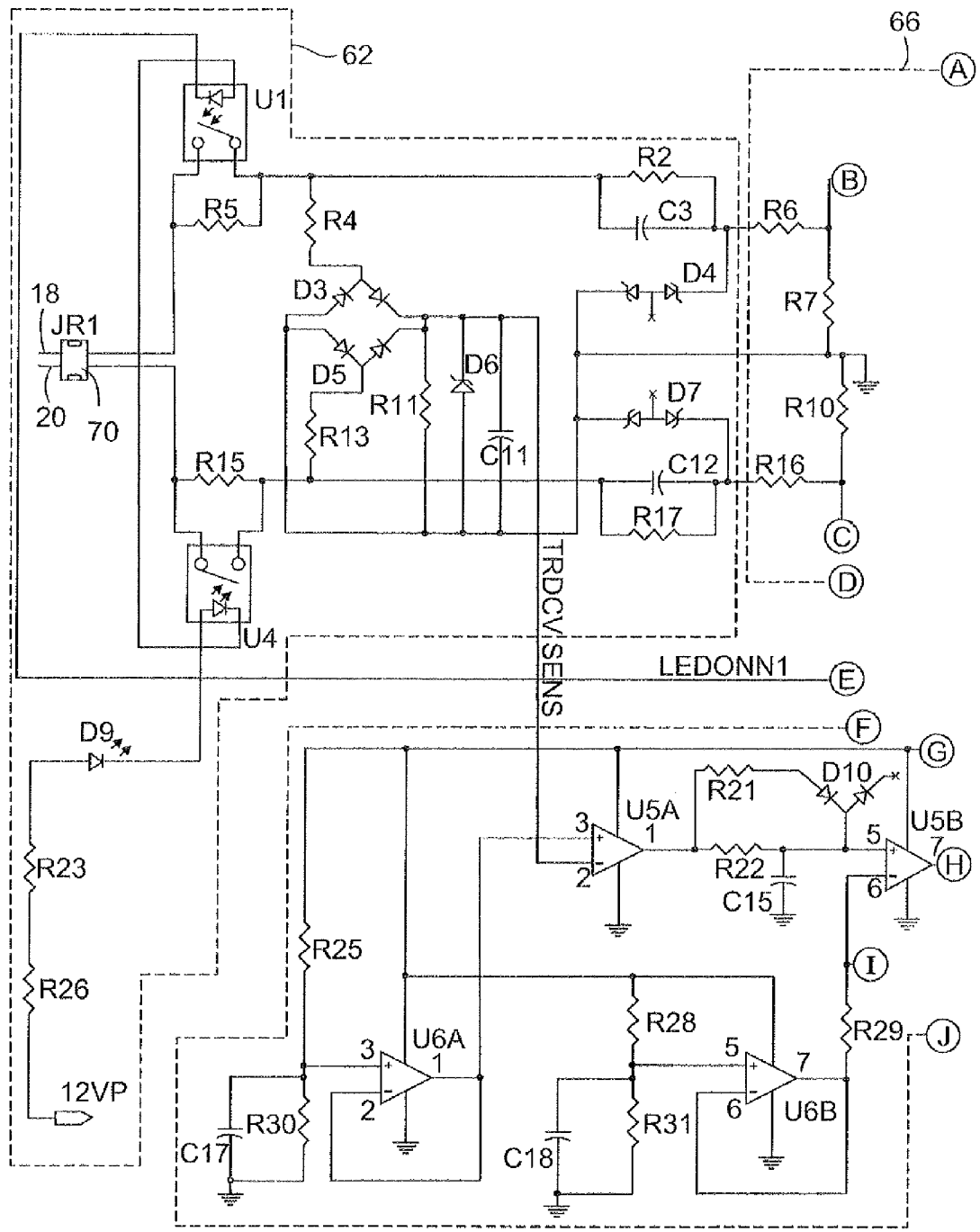
FIG. 3A is a detailed schematic of a first portion of the circuit of the bridge module along with a legend illustrating the relationship between FIGS. 3A and 3B.
Figure 3B:
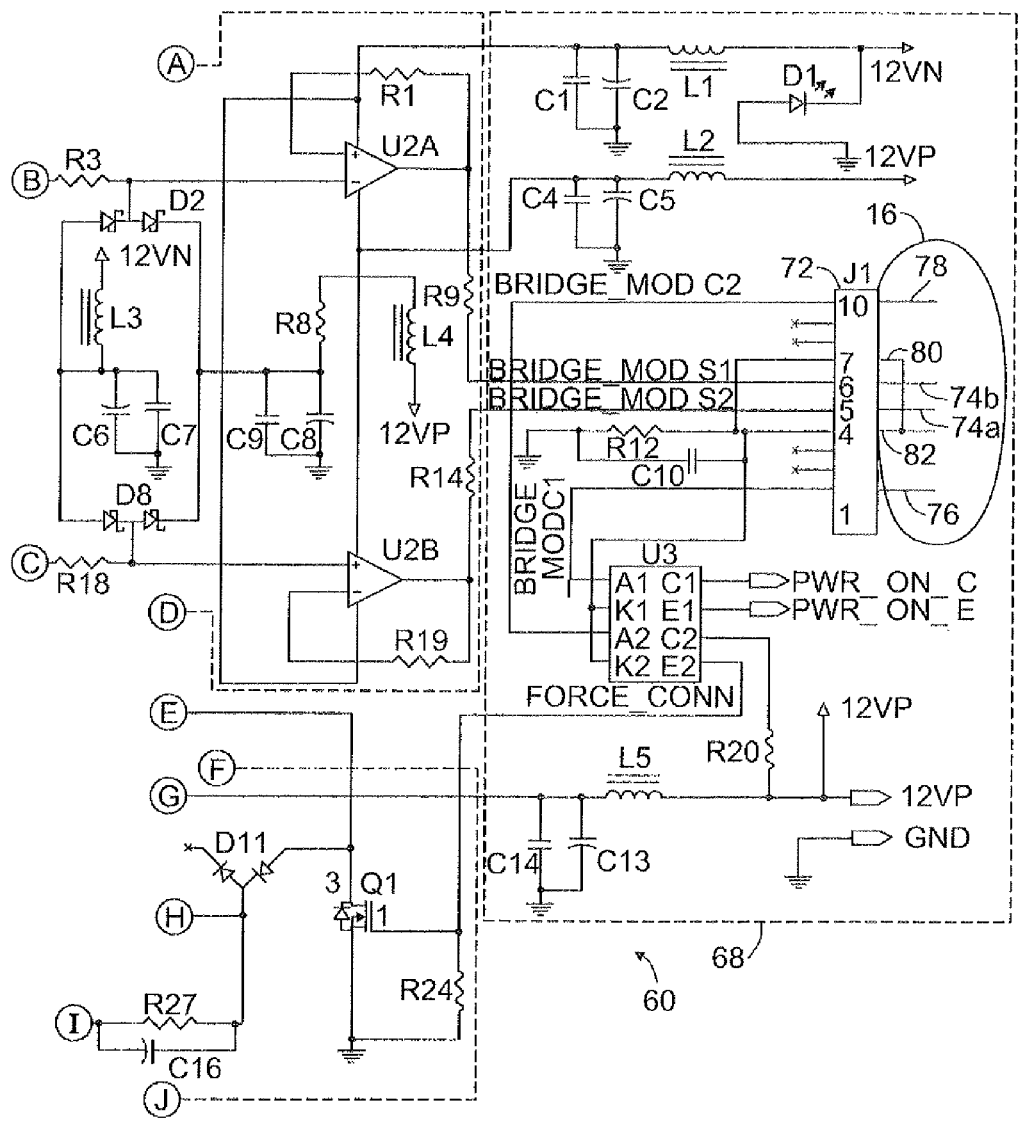
FIG. 3B is a detailed schematic of a second portion of the circuit of the bridge module along with a legend illustrating the relationship between FIGS. 3A and 3B.

The circuitry 60 of the bridge module 10 is illustrated in further detail in FIG. 3. For ease of discussion, different portions or circuits within the bridge module circuit 60 will be described. It is to be understood that each of these portions or circuits together form the bridge module circuit 60. The bridge module circuit 60 generally includes, a quiet connect circuit 62, a quiet connect control circuit 64, a wideband amplifier circuit 66, and a power supply circuit 68. Details of each of these circuits 60, 62 or portions of the bridge module circuit 60 are provided below followed by a description of the operation of the bridge module circuit 60.

Quiet Connect Circuit

The quiet connect circuit 62 provides a signal path between the line under test 12 through the leads 18, 20 and the wideband amplifier circuit 66 without disturbing the DSL signals on the line under test 12.

The quiet connect circuit 62 includes a line connector 70 for providing connection of the bridge module 10 to the first conductor (tip) 26 and the second conductor (ring) 28 of the pair of the line under test 12. The line connector 70 provides a first (tip) connection to receive lead 18 connected to the first conductor (tip) 26 of the line under test 12 and a second (ring) connection to receive lead 20 connected to the second conductor (ring) 28 of the line under test 12. The line connector 70 can be, for example, a banana or RJ11 type connector.

The quiet connect circuit 62 includes a first input switch U1 and a second input switch U4. The first input switch U1 is in electrical communication with the first connection of the line connector 70 and the second input switch U4 is in electrical communication with the second connection of the line connector 70. The input switches U1 and U4 are, for example, CPC 1018N SoP-4 type switches and include light activated MOSFET transistors.

The quiet connect circuit 62 includes a plurality of resistors R2, R4, R5, R11, R13, R15, R17, R23, and R26. Resistor R5 is a first high impedance input resistor and resistor R15 is a second high impedance input resistor each of these high impedance resistors is approximately 10 Meg Ohms. Resistors R4 and R13 are preferably approximately 1 Meg Ohm. Discharge resistors R2 and R17 and protection resistor R11 are approximately 10 Meg Ohms. Switch resistors R23 and R26 each have a value of approximately 1.0K Ohms.

The quiet connect circuit 62 includes diodes D3, D4, D5, D6, D7 and D9. Bridge rectifier diodes D3 and D5 are, for example, BAV199 SOT 23 type diodes and are arranged to provide a bridge rectifier. Protection diodes D4 and D7 are, for example, MAZ912OH type diodes. Protection diode D6 is, for example, a MAZS1100ML type diode. Switch on diode D9 is, for example, a blue LED.

The quiet connect circuit 62 further includes a first coupling capacitor C3 and a second coupling capacitor C12. The coupling capacitors C13 and C12 are, for example, 0.1 μF capacitors with a voltage rating of 250 Volts. Capacitor C11 is, for example, a 0.1 μF capacitor.

Quiet Connect Control Circuit

The quiet connect control circuit 64 senses the DC voltage between the first and second conductors of the line under test 12 (tip-to-ring voltage) to determine if the voltage is within a pre-determined range to allow connection of a DSL signal path between the line under test 12 and the wideband amplifier 66.

The quiet connect control circuit 64 includes a plurality of operational amplifiers U5A, U5B, U6A and U6B. Voltage detection comparator U5A and timer comparator U5B are provided by operational amplifiers such as for example AS8034/SO type operational amplifiers. Voltage reference source U6A and timer reference source U6B are also provided by operational amplifiers, such as for example, LM6132/SO type operational amplifiers.

The quiet connect control circuit 64 includes a charge/discharge path diode D10 and an isolation diode D11. Charge/discharge path diode D10 and isolation diode D11 are provided, for example, by BAV199 SOT23 type diodes.

The quiet connect control circuit includes a plurality of resistors R21, R22, R24, R25, R27, R28, R29, R30, R31. Resistor R21 has a value of approximately 1K Ohm, resistor R22 has a value of approximately 10 Meg Ohms, resistors R24, R27, R28, R29, and R31 each have a value of approximately 100K Ohms. Resistor R25 has a value of approximately 110K Ohms. Resistor R30 has a value of approximately 10 K Ohms.

The quiet connect control circuit 64 includes a plurality of capacitors C15, C16, C17 and C18. Each capacitor C15, C16, C17 and C18 is, for example, a 01. μF capacitor with a voltage rating of 25 Volts.

The quiet connect control circuit 64 also includes an override switch Q1 such as for example a FDN337N SoT23 type MOSFET.

Wide Band Amplifier Circuit

The wideband amplifier circuit 66 generally serves to adapt DSL signals between 4 kHz and 30 MHz from the line under test 12 using a high impedance connection (typically 200 KOhms) down to a low impedance (for example, 100 ohms) for presentation to signal analysis functions within the test instrument 14, without disturbing the line under test 12. The wideband amplifier circuit 66 amplifies the power of the DSL signals provided by the quiet connect circuit 62 before passing the signals to the test instrument 14.

The wideband amplifier circuit 66 includes a receiver provided by a first receiver U2A and a second receiver U2B. The first and second receivers U2A and U2B are operational amplifiers providing a gain of 2 such as, for example, AD8019/SO type operational amplifiers.

The wideband amplifier circuit 66 includes over voltage protectors D2 and D8. D2 and D8 are diodes such as for example, BAS40-04 type diodes.

The wideband amplifier circuit 66 includes a plurality of capacitors C6, C7, C8, C9, C10, C7 and C9 are, for example, 0.01 μF capacitors and C6 and C8 are, for example, 10 μF capacitors.

The wideband amplifier circuit 66 includes noise isolators L3 and L4. The noise isolators L3 and L4 are ferrite beads, such as for example, 0603BLM18HG102SN1D type ferrite beads.

The wideband amplifier circuit includes a plurality of resistors R1, R3, R6, R7, R8, R9, R10, R12, R14, R16, R18, and R19. First signal path resistor R6 and second signal path resistor R16 each have a value of approximately 1K Ohm. First terminate resistor R7 and second terminate resistor R10 each have a value of approximately 100K Ohms. First line driver resistor R9 and second line driver resistor R14 each have a value of approximately 49.9 Ohms. R1, R8, R16, and R19 each have a value of approximately 1K Ohm. R3 and R18 each have a value of approximately 49.9 Ohms.

Power Circuit

The power circuit 68 includes a control signal translator U3 provided by a dual optical isolator such as, for example, a MOCD207M type isolator.

The power circuit 68 includes resistors R12, R20 and capacitor C10. Resistor R12 has a value of approximately 10 Meg Ohms and resistor R20 has a value of approximately 100K Ohms.

The power circuit 68 includes capacitors C1, C2, C4, C5, C10, C13 and C14. C1, C4, and C14 are, for example, 0.01 μF capacitors and C2, C5 and C13 are, for example, 10 μF capacitors. Capacitor C10 has a value of 0.01 μF.

The power circuit 68 includes noise isolators L1, L2 and L5 which are ferrite beads, such as for example, BLM18HIG102SN1D type ferrite beads.

The power circuit 68 includes power on diode D1 which is for example a green LED.

Figure 4:
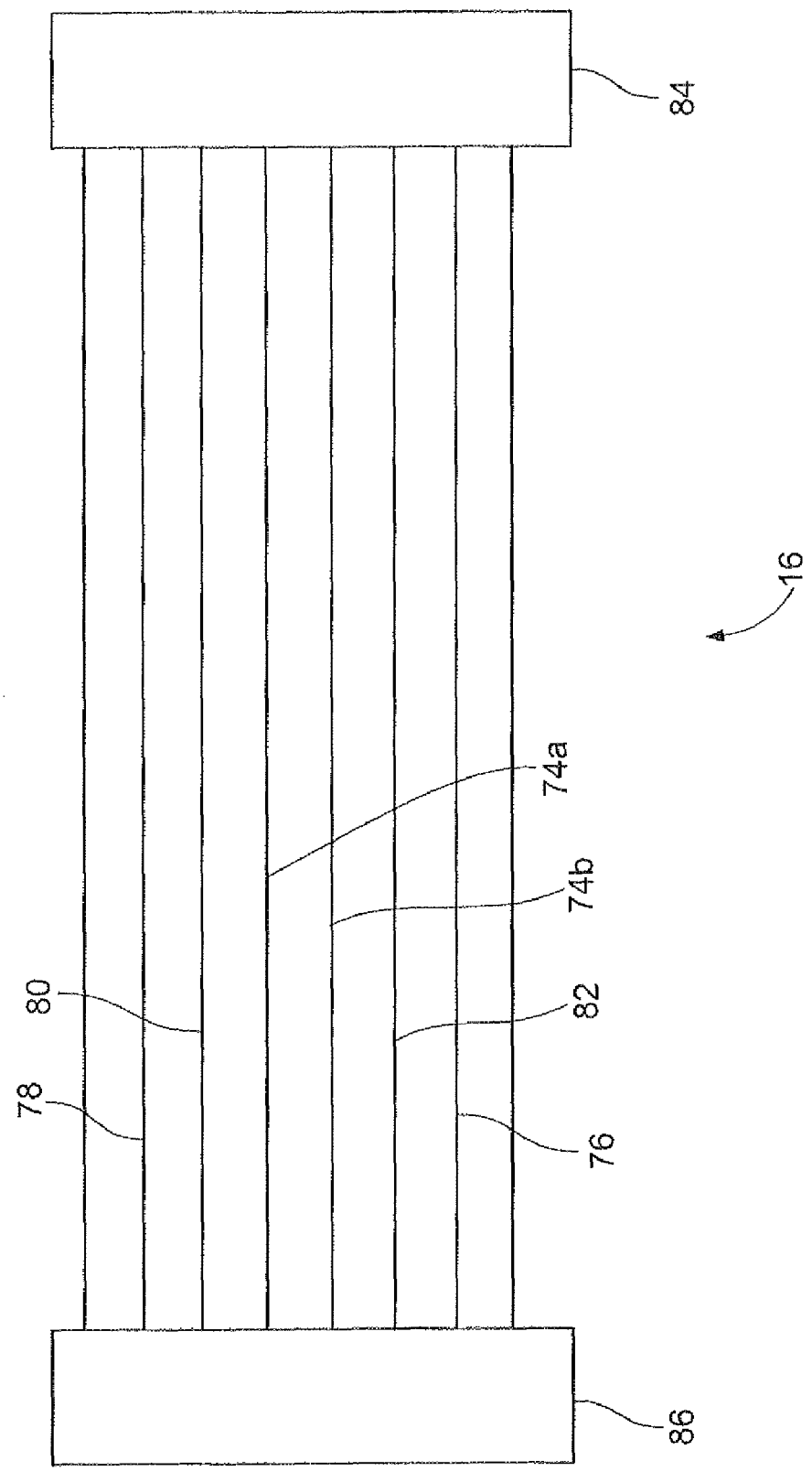
FIG. 4 illustrates the interconnect cable.

The power circuit 68 includes connection for the interconnect cable 16, direct wired or a connector 72 such as, for example, an RJ45-10 type jack which receives the interconnect cable 16 to provide connection between the bridge module 10 and the test instrument 14. As shown in FIG. 4, the interconnect cable 16 is a two-pair shielded cable and includes a 100 Ohm signal pair 74a, 74b, a first control lead 76, a second control lead 78, a first shield 80, a second shield 82, a test instrument side end 84 for connection of the test instrument 14 and a bridge module side end 86 for connection to modular jack 72 of the bridge module 10.

If the bridge module 10 is to be powered by the host system 14, control leads 76, 78 become power supply connections.

Method of Operation

Idle Mode

Use of the bridge module 10 for passively monitoring the line under test 12 begins by connecting the bridge module 10 to the test instrument 14 by connecting the interconnect cable 16 to the cable connector 42 of the test instrument 10 and by connecting the bridge module end 86 of the interconnect cable 16 to the modular jack 72 of the bridge module 10.

The signal wires 74a, 74b provide a 100 ohm signal pair. The pair 74a, 74b receives a tip side bridge module signal BRIDE_MOD_S1 from pin 6 of the modular jack 72 and a ring side bridge module signal BRIDGE_MOD_S2 from pin 5 of the modular jack 72. Shielding of the pair 74a, 74b is provided by a first shield 80 through pin 7 of the modular jack 72 and a second shield 82 through pin 4 of the modular jack 72.

The first control lead 76 of the interconnect cable 16 is connected to the bridge module circuit 60 through pin 1 of the modular jack 72 and the second control lead 78 of the interconnect cable 16 is connected to the bridge module circuit 60 through pin 10 of the modular jack 72. The first and second control leads 76, 78 provide control signals from the test instrument 14 to the dual optical isolator U3 through the modular jack 72.

Dual optical isolator U3 translates the control signals from the test instrument 14 to the wideband bridge module circuit 66. Dual optical isolator U3 includes input connections A1, K1, A2 and K2 and output connections C1, E1, C2 and E2. Connection A1 of the isolator U3 receives a power control signal BRIDGE_MOD_C1 from pin 1 of the modular plug 72 which receives a signal from a first control lead 76 in communication with the test instrument 14. The power signal BRIDGE_MOD_C1 is passed from connection A1 to output connections C1 and E1 to activate the power supply battery switches. Upon activation of the power supply battery switches, power is supplied from the batteries to the bridge module circuit 60. Power can, for example, be provided by two internal rechargeable 12 volt batteries. Alternatively two 9 volt transistor style batteries can be utilized. Alternatively still, power may be derived from the host instrument 14. Upon receiving the command to provide power to the bridge module circuit 60, the circuit 60 is in an idle mode.

In this idle mode, the first input switch U1 and the second input switch U4 are off. The DC input resistance of the first conductor or tip 26 is greater than 20 Meg Ohms primarily due to resistor R5 and the DC input resistance of the second conductor or ring 28 is greater than 20 Meg Ohms primarily due to resistor R15. In the idle mode, the first conductor or tip 26 AC input impedance is greater than 1 Meg Ohm for DSL frequencies primarily due to resistor R5 and the second conductor or ring 28 AC impedance is greater than 1 Meg Ohm for DSL frequencies primarily due to resistor R15. Due to the capacitance of the solid-state switches U1 and U4 there is a small amount of high frequency conduction through switches U1 and U4. When switches U1 and U4 are in the off state each switch has a resistance of approximately 100 Meg Ohms.

Testing Mode

When passive testing of the line under test 12 is to begin, the bridge module 10 is connected to the line under test 12. More specifically, the bridge module 10 is connected to the first and second conductors 26, 28 of the line under test by connecting the first test lead 18 between the line connector 70 and the first conductor 26 of the line under test 12 and the second test lead 20 between the line connector 70 and the second conductor 28 of the line under test 12.

The quiet connect circuit 62 provides a signal path between the line under test 12 and the wideband amplifier circuit 66 without disturbing the DSL signals on the line under test 12. Upon connection of the module 10 to the line under test 12, the input switches U1 and U4 are in the off state and the signal coupling capacitors C3 and C12 slowly begin to charge and adapt to the DC voltage of the line under test 12 via the tip input resistor R5 and the ring input resistor R15. A charging path is provided by first high impedance input resistor R5, first coupling capacitor C3, first signal path resistor R6, first terminate resistor R7, second terminate resistor R10, second signal path resistor R16, second coupling capacitor C12, and second high impedance input resistor R15. The amount of time required to fully charge coupling capacitors C3 and C12 is approximately five (5) time constants, wherein the time constant is determined by the values of the coupling capacitors C3, C12 and the high impedance input resistors R5, R15. If the time constant is sufficiently high, the charging of the coupling capacitors C3, C12 will take place sufficiently slowly such that no audible click will occur when the bridge module 10 is connected to the line under test 12.

While charge balancing is taking place, the quiet connect control circuit 64 is presented with the voltage signal TR_DCV_SENS from the bridge rectifier arrangement D3, D5 of the quiet connect circuit 62. The voltage signal TR_DCV_SENS is a polarity-assured positive voltage. The voltage signal TR_DCV_SENS represents the DC voltage between the first and second conductors 26, 28, i.e. the tip-ring DC voltage. The voltage TR_DCV_SENS is presented to the quiet connect control circuit 64 for determination of the appropriate time to activate the DSL signal path.

The purpose of the quiet connect control circuit 64, therefore, is to determine the appropriate time to pass signals from the line under test 12 to the wideband amplifier circuit 66 and ultimately to the test instrument 14 for analysis. The voltage detection comparator U5A at pin 2 receives the voltage TR_DCV_SENS from the bridge rectifier of the quiet connect circuit 62 and also receives a reference voltage at pin 3. This reference voltage is provided by pin 1 of voltage reference source U6A. If the DC voltage TR_DCV_SENS on pin 2 of the voltage detection comparator U5A is less than the reference voltage the quiet connect control circuit remains inactive. If the DC voltage TR_DCV_SENS on pin 2 of the voltage detection comparator U5A is greater than the reference voltage, pin 1 of the voltage detection comparator U5A drops from +12 Volts to near 0 Volts, activating the quiet connect control circuit 64.

The reference voltage provided to the voltage detection comparator U5A at pin 3 is preferably 1 volt. It has been determined that a reference voltage of 1 volt is sufficiently low to ensure switching of the voltage detection comparator U5A. The lowest anticipated voltage of the voltage signal TR_DCV SENS is 6 volts. Based on the values of the resistors provided in the quiet connect circuit 62, a voltage divider having a ratio of approximately 4:1 is provided. Thus, at the lowest anticipated voltage of 6 volts from tip 26 to ring 28, TR_DCV_SENSE will be approximately 1.5 volts. A tip-to-ring voltage of 1.5 volts will overcome the 1 volt reference voltage applied to voltage detection comparator U5A to initiate the timer C15.

Upon activation of the quiet connect control circuit 64 and the change in voltage on pin 1 of the voltage detection comparator U5A, a slow discharge of the line connect timer C15 begins. The timer C1 is discharged from 12 volts down to 0 volts via resistor R22, providing a time delay function, allowing time for the charge balancing process in the quiet connect circuit 62 to complete, i.e. allowing time for coupling capacitors C3 and C12 to become fully charged. The time constant of the timer C15 and timer resistor R22 is selected to ensure that a time equivalent to at least four and preferably five time constants of the quiet connect circuit 62 (i.e. the time constant provided by high impedance input resistor R5 and coupling capacitor C3, or high impedance input resistor R15 and coupling capacitor C62) will pass prior to discharge of the capacitor C15. It is to be understood that the timer function can be provided by a variety of circuits including a digital timer.

The voltage across the timer C15 is provided to pin 5 of the timer comparator U5B and pin 6 of the timer comparator U5B receives a reference voltage of 6 volts from pin 7 of timer reference source U6B. When timer C15 has discharged to less than 6 volts, pin 7 of timer comparator U5B changes from ±12 volts to near 0 volts.

Connection from pin 7 of timer comparator U5B to input switches U1 and U4 of the quiet connect circuit 62 is provided through isolation diode D11. When pin 7 of timer comparator U5B has changed to near 0 volts, current flows via the connection LEDONN1 through the internal LEDS of input switches U1 and U4, thereby turning on the light activated MOSFET transistors in the input switches U1 and U4. When the light activated MOSFET transistors of input switches U1 and U4 are turned on the resistance of the input switches U1 and U4 is lowered from 100 Meg Ohms to several Ohms. With switches U1 and U4 in the on state, current is passed to diode D9 and the blue LED is lighted to provide an indication that U1 and U4 are in the on state.

With input switches U1 and U4 in the on state and the resistance of input switches U1 and U4 lowered, the DSL signal path is activated connecting the line under test 12 through the wideband amplifier circuit 66 via the signal coupling capacitors C3 and C12, to the test instrument 14 for analysis. A first DSL signal path is provided between the first conductor 26 of the line under test 12 to the test instrument 14 by switch U1, coupling capacitor C3, first signal path resistor R6, resistor R3, first receiver U2A, first line driver resistor R9, pin 6 of the modular jack 72, and line 74a of the interconnect cable 16. A second DSL signal path is provided between the second conductor 28 of the line under test 12 to the test instrument 14 by switch U4, coupling capacitor C12, second signal path resistor R16, resistor R18, second receiver U2B, second line driver resistor R14, pin 5 of the modular jack 72, and line 74b of the interconnect cable 16.

In addition to the automatic activation of the switches U1 and U4 through the timer C15, the circuit also provides for activation of the switches U1 and U4 via the override switch Q1. Switches U1 and U4 are connected to the override switch at pin 3 of the override switch Q1. Connection is provided between the test instrument 14 and the override switch Q1 via the modular jack 72 and the control signal translator U3. Connection A2 of the isolator U3 receives a control signal BRIDGE_MODE_C2 from pin 10 of the modular plug. The control signal BRIDGE_MODE_C2 is passed from the input connection A2 of the isolator to the output connections C2 and E2. Upon initiation at the test instrument by a user, outputs C2 and E2 of translator U3 activate the override switch Q1. A signal, FORCE_CONN, is provided by the control signal translator U3 to pin 1 of the over ride switch Q1. In response, the voltage on pin 3 of Q1 is provided at near 0 volts and current flows via the connection LEDONN1 through the internal LEDS of input switches U1 and U4, thereby turning on the light activated MOSFET transistors in the input switches U1 and U4. When the light activated MOSFET transistors of input switches U1 and U4 are turned on, the resistance of the input switches U1 and U4 is lowered from 100 Meg Ohms to several Ohms and switches U1 and U4 are in the on state. Thus, regardless of the voltage provided to the voltage detection comparator U5A by the bridge rectifier D3 D8, the user can force switches U1 and U4 into the on state. The override switch Q1 can, therefore, be used in instances when no or low voltages are present on the line under test 12. For instance, the override switch Q1 can be used when DSL services are provided on the line under test 12 but no analog phone service is provided on the line 12.

With switches U1 and U4 in the on state, the DSL signal paths are activated allowing DSL signals to pass from the line under test 12 to the wideband amplifier circuit 66. The wideband amplifier circuit 66 serves to adapt the source impedance of the line under test 12 to the load impedance of the test instrument 14, i.e. using a high impedance connection, DSL signals in the frequency range of approximately 4 Khz to 30 MHz from the line under test 12 are converted to approximately 100 Ohms for presentation to the test instrument 14 for signal analysis without disturbing the line under test 12.

The source impedance is adapted to the load impedance primarily through the receiver provided by U2A, U2B. The receiver is a differential amplifier provided by a first amplifier U2A and a second amplifier U2B. Each amplifier U2A and U2B provides a gain of 2. The receiver U2A, U2B amplifies the current received at the input of the amplifier and thus translates the lower power signal received from the line under test to a higher powered signal which drives the measuring circuits of the test instrument 14 having a load impedance of 100 Ohms. The impedance matching line-driver resistors R9 and R14 lose half of the amplified signal, resulting in a net gain of 1 between the line under test 12 and the test instrument 14. The receiver U2A U2B can be defined as a transimpedance amplifier.

Over protection diodes D2 and D8 provide additional overvoltage protection of the inputs of the receivers U2A and U2B by clamping incoming transient voltages to the +/− power supply voltages.

Noise isolators L1, L2, L3 and L4 isolate high frequency noise from reaching the amplifier inputs and outputs.

The bridge module 10 allows monitoring of active communication lines 12 carrying signals in a frequency range of 400 Hz to 30 MHz without disruption to an active DSL line connection. The high impedance circuit 60 of the bridge module 10 provides a quiet (or clickless) connection of the test instrument 14 to the line under test 12 which provides unobtrusive monitoring and measurement of impulse noise, and spectrum analysis of DSL signals between the telephone company DSL terminal (DSLAM) and the subscriber home DSL equipment over a wide range of frequencies. This monitoring and measurement can be performed at any point in the DSL communications link.

While a preferred embodiment of the bridge module is shown and described, it is envisioned that those skilled in the art may devise various modifications of the bridge module without departing from the spirit and scope of the appended claims.

The invention claimed is:

1. A bridge module for providing connection between a test instrument and a line under test, the line under test having a first conductor and a second conductor, the bridge module comprising:
   a first high impedance resistor in communication with the first conductor;
   a second high impedance resistor in communication with the second conductor;
   a first input switch in communication with said first conductor;
   a second input switch in communication with said second conductor;
   a first coupling capacitor in communication with said first high impedance resistor and said first input switch;
   a second coupling capacitor in communication with said second high impedance resistor and said second input switch;
   a receiver to amplify the signals received from said first and second capacitors;
   wherein when said first and second switches are in an off state, a charging path is provided by said first and second high impedance resistors and said first and second capacitors to charge said first and second capacitors; and
   wherein when said first and second switches are in an on state, a signal path is provided from said line under test to said test instrument by said first and second switches, said first and second capacitors and said receiver.

2. The bridge module as defined in claim 1, further comprising a timer in communication with said first and second high impedance resistors and said first and second switches and wherein upon expiration of said timer said switches change from an off state to an on state.

3. The bridge module as defined in claim 2, wherein said timer is provided by a resistor and a capacitor.

4. The bridge module as defined in claim 2, wherein the timer is provided by a digital timer.

5. The bridge module as defined in claim 2, further comprising a voltage detection comparator which receives a voltage between said first and second high impedance resistors.

6. The bridge module as defined in claim 5, further comprising a bridge rectifier and wherein said voltage between said first and second high impedance resistors is provided to said bridge rectifier prior to said voltage detection comparator.

7. The bridge module as defined in claim 5, wherein said voltage detection comparator is provided by an operational amplifier and a reference voltage is provided to said operational amplifier.

8. The bridge module as defined in claim 7, wherein said reference voltage is approximately 1 volt.

9. The bridge module as defined in claim 2, further comprising a timer comparator and wherein upon expiration of said timer a signal is provided from said timer comparator to change said switches from an off state to an on state.

10. The bridge module as defined in claim 9, wherein a time constant is provided by said first high impedance resistor and said first coupling capacitor and wherein expiration of said timer does not occur until a time equivalent to at least four time constants has passed subsequent the provision of power to the bridge module.

11. The bridge module as defined in claim 1, wherein said receiver is provided by a first receiver and a second receiver and wherein said first receiver receives signals from said first coupling capacitor and said second receive receives signals from said second coupling capacitor.

12. The bridge module as defined in claim 1, wherein said receiver is provided by an operational amplifier.

13. The bridge module as defined in claim 1, wherein said receiver provides a differential amplifier formed by a first amplifier and a second amplifier.

14. The bridge module as defined in claim 1, wherein said receiver is a transimpedance amplifier.

15. The bridge module as defined in claim 1, further comprising a controller (U3) and an override switch (Q1), wherein said controller provides an override signal from said test instrument to said first and second switches to turn said first and second switches on through said override switch.

16. The bridge module as defined in claim 1, wherein power to the bridge module is provided by internal batteries.

17. The bridge module as defined in claim 1, wherein power to the module is provided by the test instrument.

18. The bridge module as defined in claim 1, further comprising an interconnect cable providing a connection between the bridge module and the test instrument.

19. The bridge module as defined in claim 18, wherein said interconnect cable is provided by a 100 ohm cable.

20. The bridge module as defined in claim 1, further comprising first and second leads for connection of said bridge module to said first and second conductors and wherein a length of said first and second leads is shorter than approximately ten percent of one-fourth of the wavelength of a signal to be applied to the first and second conductors.

21. A system for testing a line under test having a first conductor and a second conductor comprising:
   an interconnect cable having a first end and a second end;
   a test instrument for testing characteristics of the line under test, said test instrument including a connector for receiving said first end of said interconnect cable, wherein said test instrument provides a passive mode of operation;
   a bridge module for providing connection between said test instrument and the line under test, the bridge module including:
      a connector for receiving said second end of said interconnect cable;
      a first high impedance resistor in communication with the first conductor;
      a second high impedance resistor in communication with the second conductor;
         a first input switch in communication with said first conductor;
         a second input switch in communication with said second conductor;
         a first coupling capacitor in communication with said first high impedance resistor and said first input switch; and
         a second coupling capacitor in communication with said second high impedance resistor and said second input switch;
   said system including a receiver for receiving signals from said first and second coupling capacitors and amplifying said signals;
   wherein when said bridge module is in a passive mode and said first and second switches are in an off state, a charging path is provided by said first and second high impedance resistors and said first and second capacitors to charge said first and second capacitors; and
   wherein when said bridge module is in a passive mode and said first and second switches are in an on state, a signal path is provided from said line under test to said test instrument by said first and second switches and said first and second capacitors.

22. The system of claim 21, wherein said receiver is provided by said bridge module.

23. The system of claim 21, wherein said receiver is provided by said test instrument.

24. The system of claim 21, wherein said receiver is provided by a first receiver ad a second receiver and wherein said first receiver receives signals from said first coupling capacitor and said second receive receives signals from said second coupling capacitor.

25. The system of claim 21, wherein said receiver is provided by an operational amplifier.

26. The system as defined in claim 21, wherein power to the bridge module is provided by internal batteries.

27. The system as defined in claim 21, wherein power to the module is provided by the test instrument.

* * * * *